US006286366B1

(12) United States Patent
Chen et al.

(10) Patent No.: US 6,286,366 B1
(45) Date of Patent: Sep. 11, 2001

(54) METHOD OF DETERMINING THE ENGINE CHARGE TEMPERATURE FOR FUEL AND SPARK CONTROL OF AN INTERNAL COMBUSTION ENGINE

(75) Inventors: Gang Chen; Zhijian James Wu, both of Rochester Hills; Anson Lee, St. Clair; Kerry D. Franks, Chelsea; Timothy L. McDonald, Novi; James R. Tamm, Ann Arbor, all of MI (US)

(73) Assignee: Chrysler Corporation

( * ) Notice: Subject to any disclaimer, the term of this patent is extended or adjusted under 35 U.S.C. 154(b) by 0 days.

(21) Appl. No.: 09/189,719

(22) Filed: Nov. 11, 1998

(51) Int. Cl.[7] ................................ G01L 3/26; G01L 2/13; G01M 15/00

(52) U.S. Cl. ............................................................ 73/117.3

(58) Field of Search .................................... 73/117.3, 116, 73/119 R, 118.1, 118.2; 60/599; 123/676

(56) References Cited

U.S. PATENT DOCUMENTS

| | | | | |
|---|---|---|---|---|
| 3,875,913 | | 4/1975 | Price . | |
| 4,659,977 | | 4/1987 | Kissel et al. . | |
| 4,961,319 | | 10/1990 | Lyon . | |
| 5,014,549 | * | 5/1991 | Morley, II et al. | 73/118.1 |
| 5,036,668 | * | 8/1991 | Hardy | 60/599 |
| 5,365,917 | | 11/1994 | Adams et al. . | |
| 5,406,921 | | 4/1995 | Noble et al. . | |
| 5,408,870 | | 4/1995 | Noble et al. . | |
| 5,435,285 | | 7/1995 | Adams et al. . | |
| 5,526,788 | | 6/1996 | Noble et al. . | |
| 5,526,871 | * | 6/1996 | Musser et al. | 73/117.3 |
| 5,584,277 | | 12/1996 | Chen et al. . | |
| 5,631,831 | * | 5/1997 | Bird et al. | 73/117.3 |
| 5,654,501 | * | 8/1997 | Grizzle et al. | 73/117.3 |
| 5,791,319 | * | 8/1998 | Friedrich et al. | 123/571 |
| 5,809,437 | * | 9/1998 | Breed | 73/117.3 |

* cited by examiner

*Primary Examiner*—Benjamin R. Fuller
*Assistant Examiner*—Octania Davis
(74) *Attorney, Agent, or Firm*—Mark P. Calcaterra

(57) ABSTRACT

A technique for determining the charge air temperature within an intake manifold of an internal combustion engine of a vehicle without using a dedicated temperature sensor. The technique includes identifying a non-linear dynamic model based on the physical concepts of thermal transfer and system identification technique. The charge air temperature model uses several available physical measurements from the vehicle, including inlet air temperature, engine coolant temperature, vehicle speed, manifold pressure, engine speed, exhaust gas recirculation condition, and the engine fan on/off state. The model parameters are determined based on specific vehicle characteristics, and collected data from the vehicle. The charge air temperature is predicted by the model at regular predetermined intervals from the physical measurements, the vehicle parameters and the charge air temperature from the previous time. An estimation of an initial charge air temperature when the vehicle is turned on can be obtained based on the available temperature sensor readings when vehicle is turned on and stored data of the charge temperature, and all the measured temperature readings just before the engine was turned off.

15 Claims, 2 Drawing Sheets

METHOD OF DETERMINING THE ENGINE CHARGE TEMPERATURE FOR FUEL AND SPARK CONTROL OF AN INTERNAL COMBUSTION ENGINE

BACKGROUND OF THE INVENTION

1. Field of the Invention

The present invention relates generally to a method of determining the air temperature in the intake manifold of an internal combustion engine and, more particularly, to a method of defining a dynamic temperature model that predict the temperature of the air in the intake manifold of an internal combustion engine based on thermal transfer and vehicle parameters of the engine.

2. Discussion of the Related Art

Most internal combustion engines associated with a vehicle incorporate a temperature sensor positioned within the intake manifold of the engine to determine the temperature of the air entering the engine cylinders, sometimes referred to as the engine charge air temperature. This temperature measurement is important to provide the signals that control fuel and spark to the cylinders at the appropriate time for proper and efficient operation of the engine. Because colder air is more dense than hotter air, the amount of air charge in the cylinders is different depending on the charge air temperature, and thus the application of fuel and spark to the cylinders needs to vary depending on this temperature. In other words, the charge temperature is critical because this temperature determines the charge air quantity entering the cylinders regardless of the different ambient conditions. The charge temperature thus affects automatic idle speed (AIS), knock, start fuel and on-board diagnostics (OBD) features of the engine. Currently, a "speed-density" method is used for the fuel control. In combination with MAP and RPM readings, the charge temperature is used to determine the fuel injection pulse width control signal.

FIG. 1 depicts an engine control module 10 including a central processing unit (CPU) 12. A number of sensor inputs are applied to the CPU 12, and outputs from the engine control module 10 control certain operations of the vehicle engine, as is understood in the art. An ambient temperature measurement is currently provided to the engine control module 10 to control the engine radiator fan, A/C, exhaust gas recirculation (EGR), target idle speed, purge, $O_2$ sensor diagnostics and start fuel controls. It has been determined that a relationship exists between the ambient air temperature and the charge temperature. However, current vehicles incorporate separate temperature sensors to measure both.

Temperature sensors are known, such as thermocouples, that can give highly accurate temperature measurements of the engine charge temperature. However, the type of temperature sensor generally positioned within the intake manifold is typically an inexpensive heat resistive element whose accuracy is limited.

What is needed is a technique for determining the charge temperature of the air in the intake manifold of an internal combustion vehicle that does not require a dedicated charge air temperature sensor, so as to eliminate the cost of the sensor and improve charge temperature accuracy. It is therefore an object of the present invention to provide such a technique.

SUMMARY OF THE INVENTION

In accordance with the teachings of the present invention, a non-linear, dynamic charge air temperature model is disclosed for determining the charge air temperature within an intake manifold of an internal combustion engine, where the charge air temperature model is based on the physical concepts of heat transfer and the system identification techniques. The charge air temperature model uses several available physical measurements from the vehicle, including inlet air temperature, engine coolant temperature, vehicle speed, manifold absolute pressure, engine speed, exhaust gas recirculation condition, and the engine radiator fan on/off state. The current charge air temperature is determined by the model at regular predetermined intervals from the physical measurements which are available in the engine systems, and the charge air temperature from the previous time. An estimation of an initial charge air temperature when the vehicle is initially turned on can be obtained based on the measurement of the engine coolant temperature and the inlet air temperature both at the time when the engine is turned off and at the time the engine is turned on, together with the estimated charge air temperature just before the engine is turned off.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
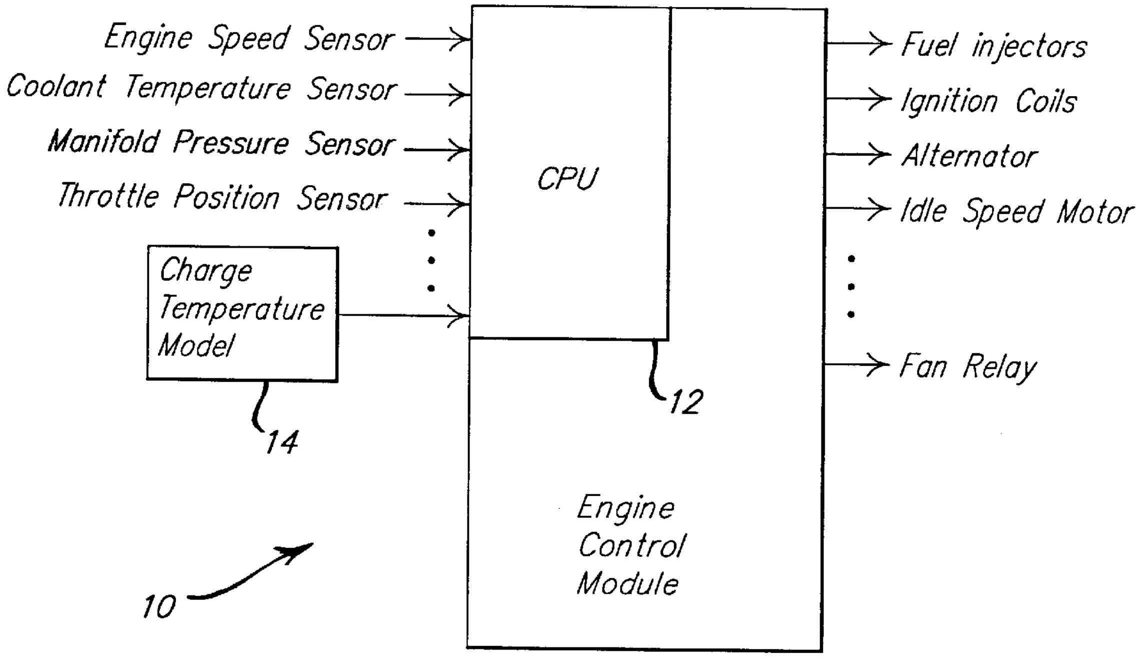
FIG. 1 is a block diagram showing the inputs and outputs of an engine control module.

The following description of the preferred embodiments directed to a charge temperature prediction model for an internal combustion engine is merely exemplary in nature, and is in no way intended to limit the invention or its applications or uses. For example, the prediction model of the invention is specifically used for determining the charge air temperature of an internal combustion engine. However, the model may have uses in other areas for estimating or predicting temperature.

According to the present invention, a charge temperature prediction model has been developed based on the physical concepts of heat transfer and system identification technique to determine the charge temperature for a particular vehicle engine. Even though a physical relationship does exist between the ambient air temperature and the charge temperature, determination of the charge temperature is very complicated and affected by many engine operating conditions. In one embodiment, determination of the charge temperature $T_m$ by the model is based on an inlet air temperature $T_{in}$ measurement in combination with other already available engine data, including engine coolant temperature $T_c$, vehicle speed $V_s$, manifold pressure P, engine speed N, exhaust gas recirculation (EGR) condition, and the engine radiator fan on/off state $V_f$. As will be discussed below, these vehicle parameters, in combination with the physical concepts of heat transfer, will be used to estimate the charge temperature $T_m$.

First, it may be advantageous to develop a theoretical model of heat transfer that can be used to define the charge temperature model. The charge air temperature in the manifold is not only a heat transfer process but also a gas dynamic process. The basic governing equation of the temperature dynamics in the manifold is given by:

$$\frac{dT_m}{dt} = \frac{T_m}{P_m V_m}\left[a_a^2 m_{ai}\left(1 - \frac{T_m}{\gamma T_a}\right) + a_3^2 m_{ci}\left(1 - \frac{T_m}{\gamma T_e}\right) - (\gamma - 1)\eta_{vol} P_m \frac{ND}{nx} + hA_w(\gamma - 1)(T_{mw} - T_m)\right] \quad (1)$$

where $$m_{ai} = \frac{A_t C_D P_a}{a_a^2}\sqrt{\frac{2\gamma C_p}{R}}\left[1 - X_1^{\frac{\gamma-1}{\gamma}}\right]^{\frac{1}{2}} X_1^{\frac{1}{\gamma}}$$

$$m_{ei} = \frac{A_e C_{De} P_e}{a_e^2}\sqrt{\frac{2\gamma C_p}{R}}\left[1 - X_1^{\frac{\gamma-1}{\gamma}}\right]^{\frac{1}{2}} X_1^{\frac{1}{\gamma}}$$

where, $\eta_{vol}$ is the engine volumatic efficiency;

N is the engine speed;

D is the engine displacement;

n is the number of cylinders;

x is the number of fire strokes in one revolution;

h is the heat transfer coefficient;

A is the surface area of the manifold;

$\gamma$ is the ratio of specific heat;

a is the sound speed of gas;

t is the time;

$C_P$ is the constant pressure specific heat;

R is the gas constant; and $C_D$ is the discharge coefficient.

Subscript:

a is the ambient air;

e is the exhaust gas;

m is the parameters in the manifold;

w is the parameters on the manifold wall; and t is the parameters at throttle.

In equation (1), X is the pressure ratio across the throttle plate and the EGR valve, a is the speed of sound, $X_1$ accounts for choked flow ($X_1$=0.528 if X<0.528 and $X_1$=X if X>0.0528), and $T_{mw}$ is the mean manifold surface temperature. The equation defining $T_{mw}$ may be expressed as:

$$\frac{dT_{mw}}{dt} = \frac{T_e - T_{mw}}{R_c} + \frac{T_a - T_{mw}}{R_a} + \frac{T_i - T_{mw}}{R_f} + \frac{T_c^4 - T_{mw}^4}{R_r} \quad (2)$$

$R_c$ is the heat conduction heat resistance, $R_f$ means the forced convection heat resistance $R_a$ is referred to as the natural convection heat resistance, and $R_r$ is the radiation heat resistance.

These equations give an understanding to what physical variables the charge temperature is related to. However, these equations can not be used in the real time charge temperature prediction. First, the above equations require several inputs that are not available from the existing measurements in an engine control unit, such as the temperature and pressure of the ambient air and exhaust gas. Secondly, these equations contain many unknown nonlinear parameters and they are not easily determined or identified in a real application. Thirdly, the equations are mathematically complicated for a real time embedded system used in an engine control unit. They include several mathematical operations such as root square, exponential, division, that are time consuming for an embedded system to solve and thus the implementation may be a problem for a processor with limited computational resources. Because of these reasons, a new and simple method for the charge temperature predictions has been developed according to the invention. With the help of system identification techniques and vehicle test data, an empirical dynamic model for the charge temperature has been developed, based on physical concepts.

According to the invention, the charge temperature equation is given as:

$$\frac{dT_m}{dt} = f_{cv}(N, P, EGR)(T_m - T_{in}) + f_{cd}(V_s, V_f, T_c)(T_o + T_{in}) + f_{cr}(V_s, V_f, T_c)T_{ck}^4 + f_{mr}T_{mk}^4 \quad (3)$$

The function $f_{cv}$ in the first term of equation (3) provides the heat transfer contribution to the rate of charge temperature change $dT_m/dt$ as the difference between the charge temperature $T_m$ and the inlet air temperature $T_{in}$ entering the manifold. This contribution is based on the engine speed N, the pressure P in the intake manifold and the exhaust gas recirculation (EGR) condition. The function $F_{cd}$ in the second term of equation (3) provides the heat transfer contribution to the rate charge temperature change $dT_m/dt$ as the difference of the engine coolant temperature $T_c$ and the air inlet temperature $T_{in}$. This contribution is based on the vehicle speed $V_s$, the radiator fan on/off state $V_f$ and the temperature of the engine coolant $T_c$. The function $f_{cr}$ in the third term of equation (3) provides the heat transfer contribution from heat radiation from the engine block based on the coolant temperature $T_{ck}$. This contribution is based on the vehicle speed $V_s$, the radiator fan on/off state $V_f$ and the engine coolant temperature $T_c$. The function $f_{mr}$ in the fourth term of equation (3) provides the radiation heat transfer effect from the manifold itself, where $T_{ck}$ and $T_{mk}$ are the absolute temperature of $T_c$ and $T_m$, respectively.

Since the gas dynamic process is much faster than the heat transfer process, the engine speed N, the manifold pressure P and the EGR condition play the most significant roles in the quick response change of charge temperature $T_m$. The coolant temperature $T_c$, the inlet air temperature $T_{in}$ and the vehicle speed $V_s$ which evolve in the intake manifold heat transfer process have a slow influence on the charge temperature. When the engine is hot, the radiative heat transfer is also not negligible.

Based on the theoretical models, the rate of intake charge temperature change $dT_m/dt$ has now been defined as a function of related engine operation variables, as discussed above. For the practical implementation in the engine control unit, a discrete model of the difference equation (3) can then be defined as:

$$T_m(n)=T_m(n-1)+f_{cv}[T_m(n-1)-T_{in}(n-1)]+f_{cd}[T_c(n-1)-T_{in}(n-1)]+f_{cr}T_{ck}^4(n-1)+f_{mr}T_{mk}^4(n-1) \quad (4)$$

where, $$f_{cv}=a_0+a_1N(n-1)+a_2N^2(n-1)+a_3N^3(n-1)+a_4N(n-1)P(n-1)+a_5R(n-1)+a_6P(n-1)R(n-1)+a_7P^2(n-1)+a_8P^3(n-1)R(n-1)$$

$$f_{cd}b_0+b_1V_s(n-1)+b_2V_n(n-1)+b_3V_f(n-1)$$

$$f_{cr}C_0+C_1V_s(n-1)+C_2V_n(n-1)+C_3V_f(n-1)$$

$$V_n(n-1)=[\alpha_0-T_c(n-1)][1-V_s(n-1)] \text{ if } T_c(n-1)<\alpha_0; \text{ otherwise } V_n(n-1)=0$$

$$T_{ck}(n-1)=\beta_0+\beta_1T_c(n-1)$$

$$T_{mk}(n-1)=\beta_0+\beta_1T_m(n-1)$$

Here, n represents the current time and n−1 represents the previous time. The sampling time or the time interval between the executions is fixed. The current charge air temperature $T_m(n)$ is calculated from the previous charge air temperature $T_m(n-1)$, coolant temperature $T_c(n-1)$, inlet air temperature $T_{in}(n-1)$, vehicle speed $V_s(n-1)$, fan on/off state $V_f(n-1)$, engine speed N(n−1), manifold absolute pressure P(n−1), exhaust gas recirculation (EGR) duty cycle percentage R(n−1). Here, $a_0 \ldots a_8$, $b_0 \ldots b_3$, $C_0 \ldots C_3$, $\alpha_0$, $\beta_0$ and $\beta_1$ are predetermined parameters and constants for a particular vehicle engine based on actual tests conducted on the engine at the development stage. Therefore, once these coefficients are determined for a particular vehicle, they are fixed for that vehicle to accurately determine the charge temperature $T_m$.

Figure 2:
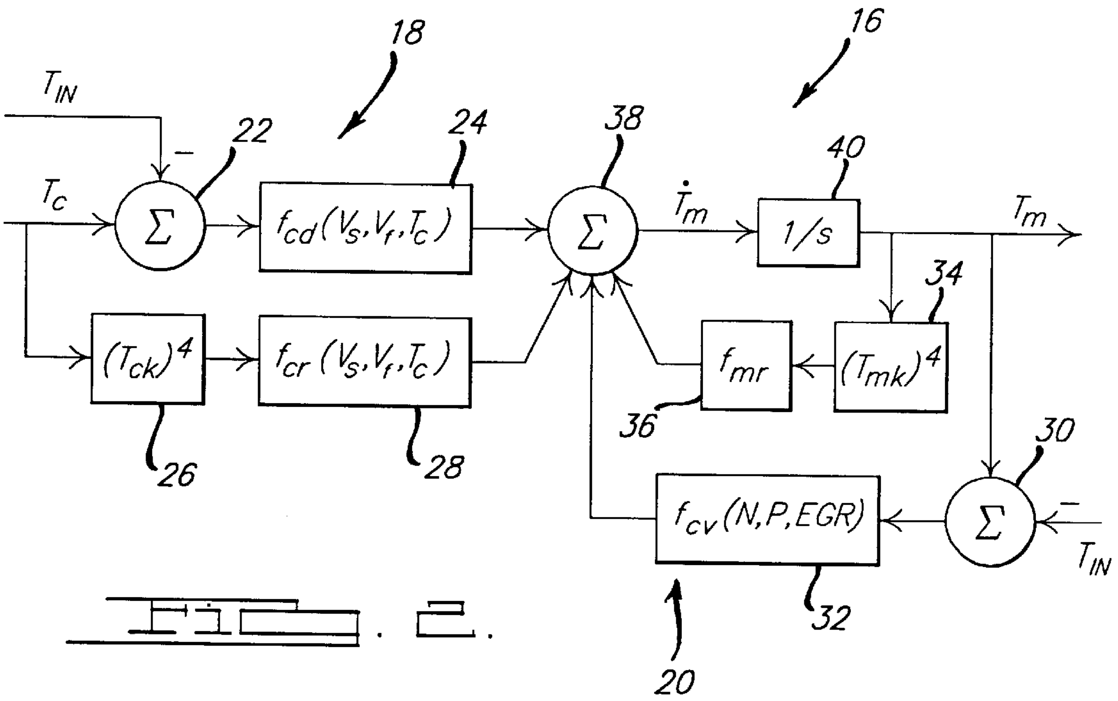
FIG. 2 is a system view of a charge temperature prediction model, according to an embodiment of the present invention.

FIG. 2 shows a block diagram of a first order non-linear dynamic system 16 based on equations (3). The dynamic system 16 is separated into a feed forward portion 18 and a feedback portion 20. In the feed forward portion 18, the $f_{cd}$ heat transfer contribution is determined by subtracting the inlet air temperature $T_{in}$ from the engine coolant temperature $T_c$ in a summer 22, and applying the difference to a function block 24 that determines $f_{cd}$ based on the vehicle speed $V_s$, the radiator fan on/off state $V_f$, and the coolant temperature $T_c$. To determine the heat transfer contribution from heat radiation from the engine block, the engine coolant temperature $T_{ck}$ is multiplied to the fourth power in block 26, and the coefficient function $f_{cr}$ is determined in block 28 based on the vehicle speed $V_s$, the radiator fan on/off state $V_f$, and the coolant temperature $T_c$.

In the feed forward portion 18, to determine the heat contribution from the term $f_{cv}$, the inlet air temperature $T_{in}$ is subtracted from the charge temperature Tm in a summer 30, and $f_{cv}$ is determined in block 32 based on the engine speed N, the manifold pressure P, and the EGR condition. To determine the contribution from the heat radiation from the intake manifold, the charge temperature $T_{mk}$ is multiplied to the fourth power in block 34, and $f_{mr}$ is then determined in block 36. Each of the heat contribution from function blocks $f_{cd}$, $f_{cr}$, $f_{cv}$ and $f_{mr}$ are then added together in a summer 38. This gives the change in charge temperature with respect to time $dT_m/dt$, which is integrated by an integrator 40 to generate the charge temperature $T_m$.

The technique for the parameter identification is to first define a prediction error function $\epsilon_i(q)$ in terms of the measured charge temperature $\hat{T}_m(t_i)$for N=1, . . . , N, and the predicted charge temperature $T_{in}(t_i,q)$, for i=1, . . . , N, from the model including the parameter vector $q=[a_0,a_1, \ldots, a_8, b_1, \ldots, b_3, c_0, c_1, \ldots c_3]$. The error function is given as:

$$\epsilon_i(q)=T_m(t_i,q)-\hat{T}_m(t_i) \tag{5}$$

Then, the parameters q are determined by minimizing the square error in all $t_i$, for i=1, . . . , N, as:

$$\min\sum_{i=1}^{N}\epsilon_i^2(q) \tag{6}$$

Figure 3:
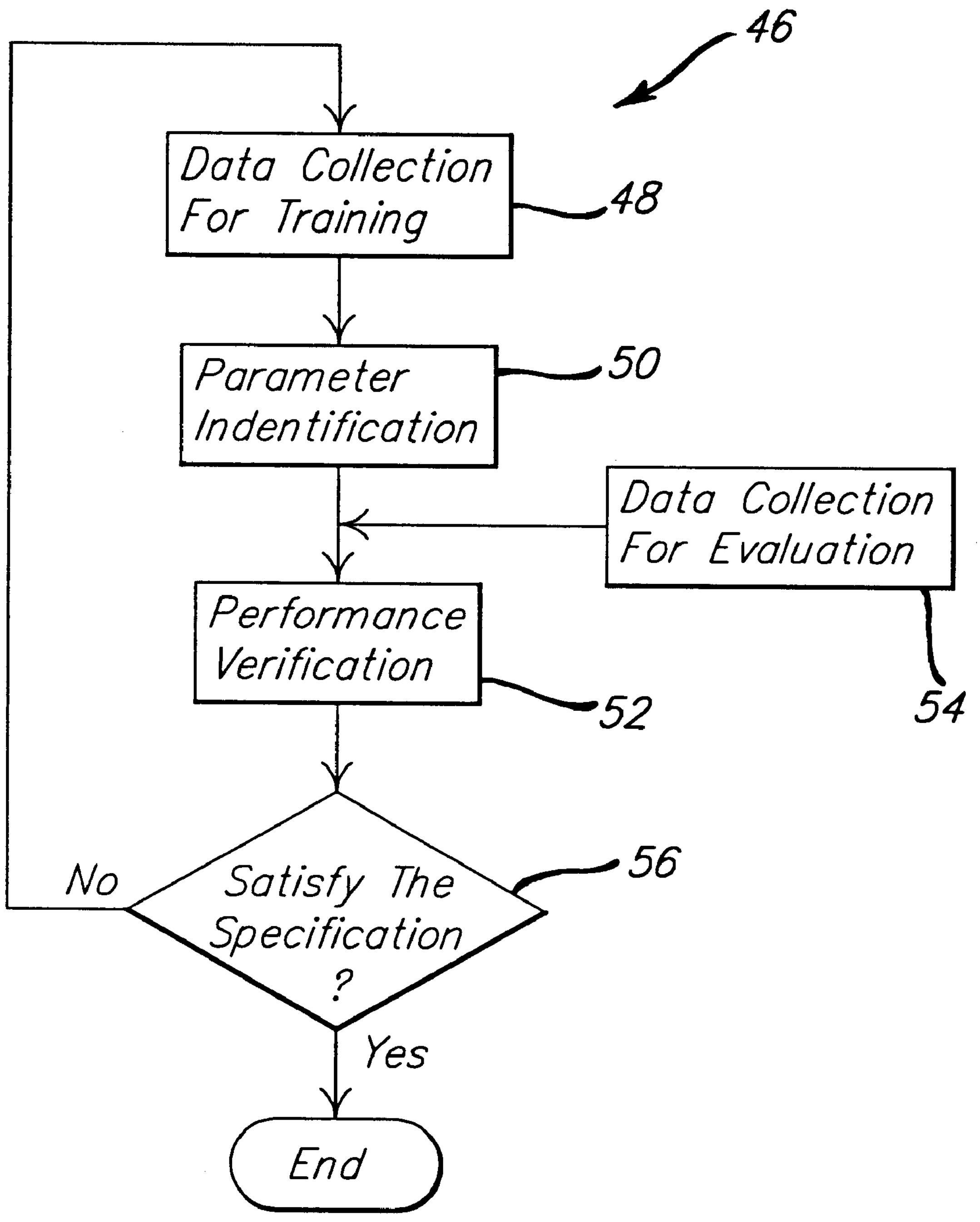
FIG. 3 is an off-line procedure of model parameter calibration for the prediction module shown in FIG. 2.

The procedure for determining the coefficients is illustrated in a flow diagram 46 shown in FIG. 3. The charge temperature $T_m$ and the model's input data are collected for training at box 48. Then, initial values and coefficients for the particular vehicle are identified at box 50. The parameters are downloaded to an engine controller for real time prediction as indicated by box 52. The performance verification includes data collection for evaluation during the performance test, as indicated by box 54. A decision diamond 56 determines if the coefficients accurately satisfy the charge temperature prediction based on the comparison with actual temperature measurements. If not, the process is performed again with new or modified coefficients.

When the engine is cool, the charge temperature $T_m$ is equal to the inlet air temperature $T_{in}$ In the case of a hot restart, the charge temperature $T_m$ is different from the inlet air temperature $T_{in}$ due to the air flow pipe and manifold heating effect. Therefore, an estimation of initial charge temperature is required.

When the engine is off, there is no way to keep track of the charge temperature $T_m$. When the engine is turned on, the coolant temperature $T_c$ and the inlet air temperature $T_{in}$ are immediately available. These values are not enough to accurately determine the initial charge temperature $T_m$. In order to estimate the initial charge temperature $T_m$, the values of the coolant $T_c$, inlet air temperature $T_{in}$ and predicted charge temperature $T_m$ just before the engine was turned off in the previous engine start are required. These values could be stored in a non volatile memory when the engine is shut off.

To obtain the initial value of the charge temperature $T_m$ after the engine is turned on, a set of engine-off differential equations are solved from the available information. To simplify the problem, the radiation effect is neglected in the engine-off model. Three unknowns, $T_m$, $T_i$, and t can be obtained by solving the following three equations.

$$\frac{dT_m}{dt} = f_{11}T_c + f_{12}T_i + f_{13}T_{in} + f_{14}T_m \tag{7}$$

$$\frac{dT_c}{dt} = f_{21}T_c + f_{22}T_i + f_{23}T_{in} + f_{24}T_m \tag{8}$$

$$\frac{dT_{in}}{dt} = f_{31}T_c + f_{32}T_i + f_{33}T_{in} + f_{34}T_m \tag{9}$$

where $T_i$ is the ambient temperature, t denotes time and $f_{ij}$ are the constants which may be equal to zero when the coefficient is very small. Once the initial value is established, the estimation becomes a routine with each time step.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of determining a charge air temperature of a vehicle, said method comprising the steps of:

determining an inlet air temperature to a manifold of the vehicle;

determining an engine coolant temperature;

determining a speed of the vehicle;

determining a manifold absolute pressure within the manifold of the vehicle;

determining a speed of the vehicle engine;

determining an exhaust gas recirculation condition;

determining an on/off state of a vehicle engine fan; and determining the charge air temperature based on heat transfer and vehicle parameters, including determining the charge air temperature by an equation that uses the inlet air temperature, the engine coolant temperature, the vehicle speed, the manifold pressure, the engine speed, the exhaust gas recirculation condition and the engine fan on/off state as inputs to the equation, wherein the step of determining the charge air temperature includes adding together several heat contribution terms, wherein a first heat contribution term is based on the engine speed, the manifold pressure and the exhaust gas recirculation condition, a second heat contribution term is based on the vehicle speed, the radiator fan on/off state, and the engine coolant temperature, a third heat contribution term is based on the vehicle speed, the radiator fan on/off state and the engine coolant temperature, and a fourth heat contribution term is based on the heat transfer of the manifold, and wherein the equation is:

$$\frac{dT_m}{dt} = f_{cv}(N, P, EGR)(T_m - T_{in}) + f_{cd}(V_s, V_f, T_c)(T_o + T_{in}) + f_{cr}(V_s, V_f, T_c)T_{ck}^4 + f_{mr}T_{mk}^4$$

where $f_{cv}$ is a coefficient for the first term, $f_{cd}$ is a coefficient for the second term, $f_{cr}$ is a coefficient for the third term and $f_{mr}$ is a coefficient for the fourth term, wherein the coefficients $f_{cv}$, $f_{cd}$, $f_{cr}$, and $f_{mr}$ are based on vehicle parameters, N is the engine speed, P is the intake manifold pressure, BGR is the exhaust gas recirculation condition, $V_s$ is the vehicle speed, $V_f$ is the radiator fan on/off state, $T_c$ is the engine coolant temperature and $T_m$ is the charge air temperature.

2. The method according to claim 1 wherein the step of determining the charge air temperature includes using an already determined charge air temperature from a previous step of determining the charge air temperature.

3. The method according to claim 1 further comprising the steps of determining particular system data and model parameters for a particular vehicle.

4. The method according to claim 3 wherein the steps of determining particular system data and model parameters for a particular vehicle includes performing an estimation routine including collecting data during a vehicle test for the particular vehicle.

5. The method according to claim 3 wherein the steps of determining the particular system data and model parameters includes identifying a plurality of unique variables for the particular vehicle.

6. The method according to claim 3 wherein the step of determining model parameters includes defining a prediction error function in terms of measured charged temperatures.

7. The method according to claim 1 further comprising the step of determining initial values for the charge air temperature when the vehicle engine is first turned on.

8. The method according to claim 7 wherein the step of determining the initial parameters includes determining the initial values based on the model, measured vehicle parameters remembered before the engine was turned off, and all other available measured data when the engine is turned on.

9. A method of determining a charge air temperature of a vehicle, aid method comprising the steps of:

determining physical concepts of thermal transfer associated with the vehicle;

determining a plurality of vehicle system parameters, said vehicle parameters including an exhaust gas recirculation condition and an on/off state of a vehicle engine fan; and determining the charge air temperature by an equation that calculates the charge air temperature from inputs of the physical concepts of heat transfer and the vehicle system parameters, wherein the step of determining the vehicle system parameters includes determining an inlet air temperature to a manifold of the vehicle, an engine coolant temperature, the speed of the vehicle, a manifold pressure within the manifold of the vehicle, the speed of the vehicle engine, an exhaust gas recirculation condition, and the on/off state of a vehicle engine fan, and wherein the step of determining the charge air temperature includes adding together several heat contribution terms, wherein a first heat contribution term is based on the engine speed, the manifold pressure and the exhaust gas recirculation condition, a second heat contribution term is based on the vehicle speed, the radiator fan on/off state, and the engine coolant temperature, a third heat contribution term is based on the vehicle speed, the radiator fan on/off state and the engine coolant temperature, and a fourth heat contribution term is based on the heat transfer of the manifold, said equation being:

$$\frac{dT_m}{dt} = f_{cv}(N, P, EGR)(T_m - T_{in}) + f_{cd}(V_s, V_f, T_c)(T_o + T_{in}) + f_{cr}(V_s, V_f, T_c)T_c^4 + f_{mr}T_m^4$$

where $f_{cv}$ is a coefficient for the first term, $f_{cd}$ is a coefficient for the second term, $f_{cr}$ is a coefficient for the third term and $f_{mr}$ is a coefficient for the fourth term, wherein the coefficients $f_{cv}$, $f_{cd}$, $f_{cr}$, and $f_{mr}$ are based on vehicle parameters, N is the engine speed, P is the intake manifold pressure, EGR is the exhaust gas recirculation condition, $V_s$ is the vehicle speed, $V_f$ is the radiator fan on/off state, $T_c$ is the engine coolant temperature and $T_m$ is the charge air temperature.

10. The method according to claim 9 wherein the step of determining a plurality of vehicle system parameters includes defining a prediction error function in terms of measured charge temperature.

11. The method according to claim 9 further comprising the steps of determining particular system data and coefficient variables for a particular vehicle.

12. The method according to claim 11 wherein the step of determining system data and coefficient variables includes performing an estimation routine including collecting data during a vehicle test for the particular vehicle.

13. The method according to claim 9 further comprising the step of determining initial value for the charge air temperature when the vehicle is first turned on based on all the measured vehicle data when the vehicle is turned on and the data stored before the engine was turned off.

14. A system for determining a charge air temperature of a vehicle, said system comprising:

a device for determining an inlet air temperature to a manifold of the vehicle;

a device for determining an engine coolant temperature;

a device for determining a speed of the vehicle;

a device for determining manifold pressure within the manifold of the vehicle;

a device for determining a speed of the vehicle engine;

a device for determining an exhaust gas recirculation condition;

a device for determining an on/off state of a vehicle engine fan; and a control device for determining the charge air temperature based on heat transfer, said control device using an equation that combines inputs from the inlet air temperature, the engine coolant temperature, the vehicle speed, the manifold pressure, the engine speed, the exhaust gas recirculation condition, and the engine fan on/off state to determine the charge temperature, wherein the control device determines the charge air temperature by adding together several heat contribution terms, wherein a first heat contribution term is based on the engine speed, the manifold pressure and the exhaust gas recirculation condition, a second heat contribution term is based on the vehicle speed, the radiator fan on/off state, and the engine coolant temperature, a third heat contribution term is based on the vehicle speed, the radiator fan on/off state and the engine coolant temperature, and a fourth heat contribution term is based on the heat transfer of the manifold, and wherein the equation is:

$$\frac{dT_m}{dt} = f_{cv}(N, P, EGR)(T_m - T_{in}) + f_{cd}(V_s, V_f, T_c)(T_o + T_{in}) + f_{cr}(V_s, V_f, T_c)T_c^4 + f_{mr}T_m^4$$

where $f_{cv}$ is a coefficient for the first term, $f_{cd}$ is a coefficient for the second term, $f_{cr}$ is a coefficient for the third term and $f_{mr}$ is a coefficient for the fourth term, wherein the coefficients $f_{cv}$, $f_{cd}$, $f_{cr}$, and $f_{mr}$ are based on vehicle parameters, N is the engine speed, P is the intake manifold pressure, EGR is the exhaust gas recirculation condition, $V_s$ is the vehicle speed, $V_f$ is the radiator fan on/off state, $T_c$ is the engine coolant temperature and $T_m$ is the charge air temperature.

15. The system according to claim 14 wherein the control device determines the charge air temperature based on an already determined charge air temperature from a previous determination of the charge air temperature.

* * * * *